United States Patent [19]

Ekman

[11] Patent Number: 4,848,728
[45] Date of Patent: Jul. 18, 1989

[54] COUPLING ARRANGEMENT

[76] Inventor: Kjell R. Ekman, Aberenrain 43, CH-6340 Baar, Switzerland

[21] Appl. No.: 755,963

[22] Filed: Jul. 17, 1985

Related U.S. Application Data

[63] Continuation of Ser. No. 471,366, Mar. 1, 1983, abandoned.

[30] Foreign Application Priority Data

Mar. 1, 1982 [SE] Sweden .................. 8201244

[51] Int. Cl.$^4$ ............................ F16L 29/00
[52] U.S. Cl. .................. 251/149.6; 137/329.06
[58] Field of Search ............. 137/614.03, 614.04, 137/329.06; 251/149, 149.1, 149.6, 149.7

[56] References Cited

U.S. PATENT DOCUMENTS

| 112,183 | 2/1871 | Reynolds | 137/329.06 |
|---|---|---|---|
| 769,688 | 9/1904 | Cederstrom | 251/149.6 |
| 2,265,267 | 12/1941 | Cowles | 251/149.6 |
| 2,770,474 | 11/1956 | Kropp | 251/149.6 |
| 3,566,918 | 3/1971 | Rauen | 137/614.04 |
| 3,605,793 | 9/1971 | Kinsel | 137/329.06 |
| 3,643,917 | 2/1972 | Griffiths et al. | 137/329.06 X |
| 4,118,006 | 10/1978 | Norton et al. | 251/149.6 |
| 4,219,048 | 8/1980 | Ekman | 137/614.03 |
| 4,269,389 | 5/1981 | Ekman | 251/149.6 |

FOREIGN PATENT DOCUMENTS

1913334 10/1969 Fed. Rep. of Germany .
790175544 5/1982 Sweden .

*Primary Examiner*—John Fox
*Attorney, Agent, or Firm*—Pollock, Vande Sande & Priddy

[57] ABSTRACT

A coupling arrangement comprises a first coupling part (1) and a second coupling part (2) which can be connected to and disconnected from the first coupling part. The first coupling part houses a longitudinally displaceable valve (4), and a sealing device (10, 19, 20) prevents medium from leaking between the valve and the first and second coupling parts. Between opposing surfaces (4f and 1e respectively) on the outer surface of the valve and an inner wall in the first coupling part there is a first sealing elment (19, 20). The first sealing element prevents the medium pressure from reaching a surface area (4e') which, viewed in a radial direction, is located outside the opposing surfaces (4f, 1e) and is situated on the valve or adjoining the valve. In this way, the medium pressure is prevented from acting on the surface area and occasioning a force (F) which is directed counter to a lifting force (F') on the valve.

13 Claims, 2 Drawing Sheets

COUPLING ARRANGEMENT

This is a continuation of co-pending application Ser. No. 471,366 filed on Mar. 1, 1983, abandoned.

TECHNICAL FIELD

The present invention relates to a coupling arrangement comprising a first coupling part and a second coupling part which can be connected to and disconnected from the first coupling part, the first coupling part being equipped with a valve which can be displaced longitudinally when the coupling parts are being connected or disconnected, and a sealing device which prevents fluids medium from leaking between the valve and the first and second coupling parts.

PRIOR ART

Couplings, including snap-couplings, are already known wherein the seal which co-acts with the front end of the second coupling part is longitudinally displaceable in the first coupling part when the coupling parts are being connected and disconnected. In the known couplings the valve is lifted up to pass through the main flow of medium, substantially simultaneously with the longitudinal displacement of the seal in this case the seal is alloted the dual task of effecting both the seal between the valve and the first coupling part and also that between the first and the second coupling parts, in the connected state. The operation of the valve and the seal in the known case may also take place against the influence of a spring device which comprises a spring appertaining to the respective coupling elements. As a rule, the seal is designed so that it co-acts with friction, at least via some parts, with an inner wall in the first coupling part.

DESCRIPTION OF THE INVENTION

The Technical Problem

With couplings of this type there is a broad effort towards reducing more and more the force which is required to connect the first and second coupling parts together. The sealing arrangement between the coupling parts should be such that there is easy mutual rotatability around the longitudinal axis of the coupling between the first and second coupling parts, so that no torsionally strong fixings are required for the hoses or tubing adjoining the coupling.

Generally speaking, there is also a demand for a large through passage area for the medium in snap-couplings. There is also a requirement for a technically simple design which makes rational and economical production possible, and similarly that a long working life should be achieved for the coupling and the sealing elements incorporated in it, which must be incorporated so as to prevent direct mechanical damage. Amongst other things, the lifting function of the valve and the sealing arrangement should be such that there is no tendency towards biased positioning in operation.

Solution

The main object of the present invention is to create an arrangement which solves the problems described above, amongst others. The the main characteristic of the new coupling arrangement may be regarded as being the fact that between the opposing surfaces on the outside of the valve and the inner wall in the first coupling part there is a first sealing element which forms part of the sealing device and is designed to prevent the medium pressure from acting on a surface area which, viewed in a radial direction, is situated outside the opposing surfaces and is located on the valve or adjoining the valve, thereby preventing the medium pressure from acting on the surface area and producing a force which is directed counter to the lifting force on the valve.

As a furter development of the concept of the invention, detailed information is put forward on how, amongst other things, the first sealing element should be disposed relative to the first coupling part and the longitudinally displaceable valve. Accordingly, the first sealing element is arranged in an annular inwardly-facing groove, and the inner wall of the first coupling part is made with a greater diameter on that side of the first sealing element which is sealed against medium leakage by the sealing element itself. In this case, the valve is equipped with a projection which engages in extensive co-action with the first sealing element when the valve is fully open. The valve, which comprises a tube valve in a preferred embodiment, is provided with a plurality of slanting through-bores in the valve wall. The slanting through-bores are located below a valve head seal but above the first sealing element. When the valve takes up its closed position the first sealing element is disposed closely adjoining the sides of the slanting bores which are located furthest away from the valve head. The angular edges which are disposed at the outer surface of the valve wall and are nearest the first sealing element when the valve is in its closed position are bevelled down or cut back to eliminate sharp edges which might have a cutting or other damaging effect on the first sealing element.

In one embodiment said the said surface area which the medium is prevented from reaching is located on a radially projecting flange via the first side of which the valve can co-act by means of a return spring, preferably of the conical type. On the other side of the projecting flange there is a second sealing element which is intended to prevent medium from leaking between the first and second coupling parts. This sealing element is provided with a holder, which may be made of metal, for example, and which is preferably connected to the valve and therefore follows the repeated displacement movements of the latter. The valve and/or the holder extend behind the second sealing element, viewed in a radial direction, and the parts which extend behind the second sealing element rest against an inner wall surface on the first coupling part, which thus means that the second element is not involved in any friction effect with the said inner wall surface. The holder or the valve is equipped with a sleeve-shaped part which extends towards and co-acts with locking balls appertaining to a locking device between the first and second coupling parts when the valve and/or the holder take up the closed position. The valve and/or the holder is or are equipped with a lifting surface via which the second coupling part can co-act with the valve and/or holder when the first and second coupling parts are being connected together.

The second coupling part can lift the second sealing element when the pressure is low, but at higher pressures co-action between the lifting surface and the second coupling part is recommended. In order that this latter coupling part should not be able to act on the valve and/or the holder via the free end of the sleeve-shaped part, that is, the end which lies opposite the locking balls, the first coupling part is equipped with special runningin guide devices which prevent co-action between the free end and the second coupling part when the latter is being introduced into the recess in the first coupling part.

Advantages

With the above proposals an outstanding snap-coupling arrangement is obtained which can be connected and disconnected easily. The medium pressure is effectively prevented from acting on a wide surface area, and the production of a pressure force directed against the lifting force of the valve is thereby counteracted. With the present type of coupling, when lifting the valve it is necessary only to lift against the force which is occasioned by the effect of the medium pressure on the head or dome of the valve. The forces acting on the locking device (locking balls) of the snap-coupling can also be greatly reduced.

There is contact over a wide area between the sealing surface on the outer surface of the valve and the first sealing element and, in a preferred embodiment, the latter seals advantageously via approximately $\frac{1}{3}$ of its radial extent against the part of the valve. Due to the fact that sealing between the valve and the first coupling part is effected in the way indicated and the projecting flange extends behind the second sealing element and holds an inner wall on the first coupling part completely under control, low friction is obtained during mutual rotation around the longitudinal axis, between the first and second coupling parts, which means that there is no need for torsionally strong fixings for the pipe connections to the coupling parts.

The lifting function of the valve and the holder for the first sealing element, which is preferably connected to the valve, is positive and clear-cut, which means that the lifting and locking functions of the valve and the snap-coupling lock respectively can be carried out efficiently, with a long working life. The first and second sealing elements are provided with effective overload protection which prevents the sealing elements from being crushed into fragments.

The first coupling part comprises two parts, - the actual body of the coupling part and the so-called ball-holder part. These parts are connected together via threads. With the sealing arrangement proposed above, no special sealing measures need to be carried out for these thread.

The proposed sealing arrangement also means that only a return spring, preferably a conical one, so as to achieve the optimum working length for the spring, is used for the valve and the first sealing element.

The principle of the proposed coupling arrangement may be applied for various fluid media, such as air, gas, liquids, hydraulic oil, etc. Only the type of sealing element needs to be adapted to the different cases. The present example relates primarily to a coupling for medium in the form of air or another gas.

DESCRIPTION OF THE FIGURES

An embodiment of the present proposal for a coupling arrangement, displaying the characteristics which are significant to the invention, will be described in the following with reference to the accompanying drawings, on which

PREFERRED EMBODIMENT

Figure 1:
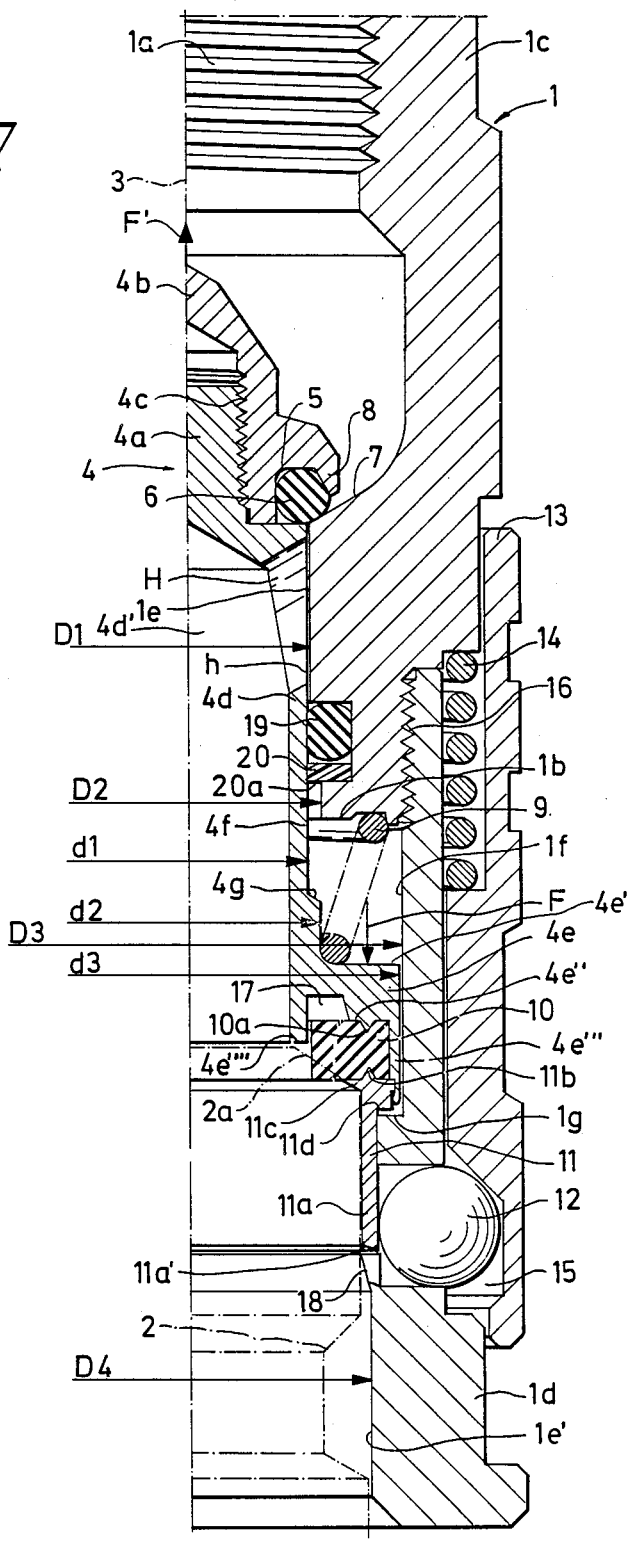
FIG. 1 is a vertical section through a first embodiment of the coupling arrangement, where only one half of the coupling arrangement is shown.

In FIG. 1 the first coupling part is indicated by the numeral 1, and the second coupling part, which is shown only in dashes, is indicated by 2. The longitudinal axis of the coupling arrangement, which is common to the first and the second coupling part, is designated 3. In the first coupling part a valve 4 is mounted longitudinally displaceable in a known way, having a dome or head section composed of a center part 4a and an outer part 4b disposed thereon and connected to the part 4a via a thread 4c. The outer part 4b and the inner part 4a are designed so that there is a space 5 for a sealing ring 6. The valve is shown occupying its closed position in FIG. 1 and in this position the sealing ring 6 co-acts with a seat 7 in the first coupling part 1. The outer part 4b is made with a strong rim 8 which extends over a large part of the circumference of the sealing ring 6. The free end of the strong rim may constitute an integral part of a mechanical overload protection device for the sealing ring 6, if desired.

The valve, which is constituted by a tube valve, also comprises a sleeve-shaped part 4d. In the wall of the sleeve-shaped part there are slanting bores H which are located closely adjoining the dome or head part 4a, 4b of the valve. The slanting bores are distributed evenly around the circumference of the sleeve-shaped part 4d. When the valve takes up its open position the slanting bores are located above the seat 7, so that medium can flow from an inner chamber 1a on one side of the seat to the chamber 4d' inside the tube valve, or vice versa. The valve 4 also comprises a flange 4e which projects out from the wall 4d. Between the surface 1b of an inner projection and the first side 4e' of the flange 4e a return spring 9 for the valve is inserted. The return spring is preferably of the conical type and in the embodiment shown the end with the greater diameter rests against the inner shoulder surface 1b, and the end with the smaller diameter rests against the surface 4e' on the flange. Naturally, it would also be possible to reverse the spring so that the end with the smaller diameter rests against the surface 1b and the end with the greater diameter rests against the surface 4e'.

In accordance with the above, the valve takes up its closed position and the second coupling part 2 is thereby introduced in the first coupling part into a longitudinal movement position where a lifting effect between the second coupling part and the valve is produced. Lifting occurs against the effect of the return spring 9, which therefore returns the valve into the position shown in FIG. 1 when the first and second coupling parts are disconnected from each other.

On the other side 4e'' of the projecting flange 4e there is a second sealing element 10. This second sealing element has a part 11 appertaining to it which may be connected to or form part of the valve 4. In the present case the valve extends via a section 4e''' right behind the second sealing element 10 and is joined at the bottom to the said part 11 which is fixed to the section 4e''' by means of clamping or some other fixing means which may be of a kind which is known per se. When the valve 4 is in its closed position the free end 11a of the part 11 is opposite the locking balls 12 which fulfil a snap-connection function between the first and second coupling parts in a way which is known per se. The locking balls are held in place with the aid of a longitudinally displaceable locking sleeve 13 of a known type. Between the locking sleeve 13 and the first coupling part there is also a spring of a known type. The end 11a is designed to retain the locking balls 12 in the space 15 appertaining to them when the second coupling part is pulled out of the first coupling part.

The first coupling part can be regarded as comprising both the actual coupling body 1c and a ball-accommodating part 1d. The said parts 1c and 1d are mutually connected via threads 16.

In the embodiment example shown in FIG. 1 the second sealing element has a substantially rectangular crosssection which is firmly clamped between the valve section at the projecting flange 4e and the part 11. The projecting flange and the part 11 are equipped with a device, of which only the element 11b on the part 11 is shown, which presses down into the material of the second sealing element. A section of the second sealing element which is pressed down in this way is designated 10a. The second sealing element is designed to rest against an oblique face 2a on the second coupling part, substantially by its elasticity alone. The second sealing element therefore has part of its section which is not fixed in but can be flexed aside while still being able to rest against the oblique surface 2a. On its lower face the projecting flange is provided with a recess 17 into which the second sealing element can be pressed in conjunction with the flexing aside. Both the projecting flange 4e and the part 11 may be equipped with lifting devices. In the present case a first lifting device on the flange is designated 4e'''' and a lifting device on the part 11 is designated 11c. Naturally, embodiments with only one of the said lifting devices are also possible.

To prevent the second coupling part 2 from co-acting with the free end 11a on the part 11 there are guide devices or tabs 18 disposed on the said end which prevent lifting contact between the second coupling part and the said free end on the part 11. The guide devices, which comprise of sections of an inner wall 1e' on the first coupling part which project inwards, have a height above the inner wall 1e' which is substantially the same as or exceeds the material thickness of the section 11a. This means that the free end of the second coupling part is suitably guided in, and it can thus pass through all the part 11 before it begins to co-act with the second sealing element and, where applicable, with one or both of the said lifting devices 11c and 4e'''' respectively.

The valve co-acts with the first coupling part via an inner surface 1e with a first diameter D1. An external surface 4f with an external diameter d1 can be brought opposite the surface 1e. Between these opposing surfaces a sealing element 19, 20 is arranged, which comprises in the embodiment example shown both an O-ring 19 and a so-called "back-up" 20 which comprises a known type of packing ring made of Teflon or some other suitable low-friction material with good sealing properties. On the side of the sealing element 19, 20 which faces away from the valve head seal 6 the inner wall 1e is given a greater diameter D2 than the diameter D1. The outer surface 4f on the valve has a correspondingly increased diameter, the greater diameter being designated d2. The transition between the two diameters is designated 4g and is of particular significance for the present invention. The transition may comprise a surface which is bevelled away at an angle, or is curved or appropriately shaped in some other way. When the valve 4 is opened into its fully open position by the co-action between the first and second coupling parts the said surface 4g of the projection is brought into co-action with a part 20a on the lower face of the sealing ring 20. Due to the fact that the sealing ring has low friction it does not exert very much resistance to the mutual rotating movements between the first and second coupling parts thus connected if these should be rotated relative to one another around their longitudinal axes or around the longitudinal axis 3. Naturally, the sealing element 19, 20 may be of some other type, but the important point is that there is a wide area of contact between the shoulder surface 4g and the sealing element in question. The shoulder surface 4g which extends round the entire circumference of the valve preferably projects a distance of between 0.5 and 3 mm. The parts 4e''' which extend behind the sealing element 10 from the projecting flange rest against an inner wall 1f on the first coupling part 1. The diameter D3 here is considerably greater than the diameters D1 and D2. The diameter of the inner wall 1e' on the first coupling part is designated D4. This internal diameter is smaller than the diameter D3 but greater than the diameters D1 and D2. The first and second coupling parts may be rotated easily relative to each other around their longitudinal axes since the only frictional resistance which arises thereby occurs at the sealing element 19, 20.

The part 11 is equipped with a radial shoulder surface 11d which extends radially outwards from the sleeve-shaped part 11a. The shoulder surface 11d can be brought opposite an inwardly-facing shoulder surface 1g on the first coupling part. The free end 11a' on the part 11 is bevelled off at an angle and can be brought opposite the tabs 18 on the inner wall 1e' of the first coupling part. Any accumulation of dirt on the inwardly projecting tabs 18 can be removed automatically by means of the slanting end edge 11a' which thus provides an automatic selfcleaning effect. There is a self-compensating function for the sealing element 6. When this sealing element has been worn down or is overloaded, the shoulders 11d, 1g or alternatively the rim 8 and the seat 7 may come into use. In this case, the distance between the end edges 11a' which are bevelled off at an angle and the guide tabs 18 is greater than the distance between the shoulders 11d, 1g and/or the rim 8 and the seat 7.

The diameter of the outer surface of the projecting flange 4e which co-acts with the inner surface 1f is designated d3. This diameter is correspondingly greater than the diameters D1 and D2.

Figure 2:
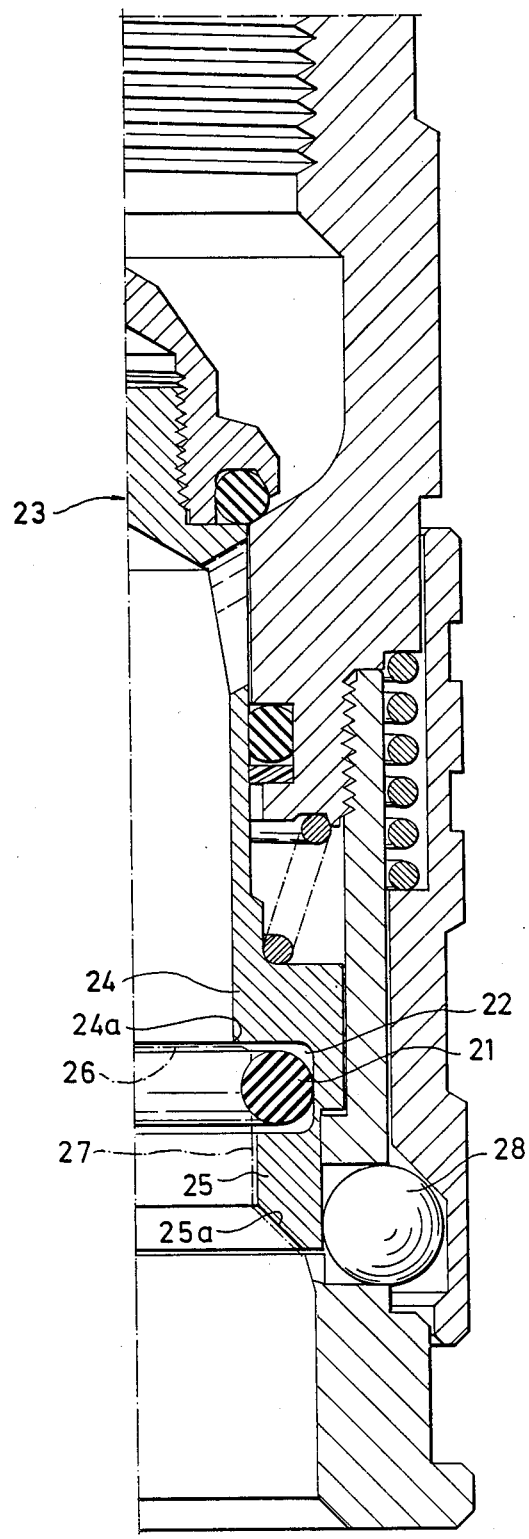
FIG. 2 is a vertical section through another embodiment of the coupling arrangement, wherein in this case again only one half thereof is shown.

The embodiment shown in FIG. 2 is largely identical in construction to the embodiment shown in FIG. 1. The difference lies in the fact that the sealing element shown in FIG. 1 is replaced by a sealing ring of the "O" type, designated 21. This sealing ring is inserted in an internal annular groove in the valve 23 at the projecting flange 24. In this instance the valve is made in a single piece, and the part of the valve which extends on the other side of the sealing element 21 is designated 25. The second coupling part 26 has a cylindrical sealing surface 27 via which the second coupling part co-acts with the sealing element 21. The part 25 on the valve is made from a relatively strong material and can be brought into position opposite the locking balls 28 in the non-actuated position of the valve. The part 25 is equipped with a surface 25a which is bevelled off at an angle. The flange 24 is equipped with a corner 24a which can be brought into position opposite the end face of the second coupling part 26. The corner 24a and the obliquely bevelled surface 25a can jointly or individually (alternatively) serve as lifting devices which can co-act with the second coupling part when the parts are being connected together.

In both the embodiments the through passage area can be kept to the optimum for the flow of medium through the connected coupling parts. The inner wall on the second coupling part extends closely adjoining the continuation of the inner wall on the tube valve 4 or 23 respectively. In other respects, the operating method of the two embodiments is the same.

Due to the above-described sealing arrangement, medium pressure is prevented from reaching the surface 4e' on the projecting flange 4e. In this way, a hypothetical force F' is prevented from acting on the surface 4e'; this force would be directed counter to the lifting force F' of the valve 4.

The invention is not limited to the embodiment shown above as an example, but it can be modified within the framework of the following Patent Claims and the concept of the invention.

The shoulder surface 4g projects at least 0,05 mm outside the outer wall 4f of the valve 4.

The sealing elements 6, 10 and 19 preferably have the embodiment form which is shown for the respective elements, but they may also conceivably have other forms. The important factor in the case of sealing element 19 is the protective bevelling down or cutting back above the sealing element 19, 20 which prevents cutting and/or other damage to the sealing element when the valve 4 is inserted into the coupling part 1 during assembly. The cutting back or bevelling down can be local, at the respective slanting bores (h in FIG. 1), or provided as a cut-back all round, by machining away, for example, at the face or faces of the valve, located nearest to the sealing element (h' in FIG. 2).

What I claim is:

1. An improved fluid coupling, comprising:
a first fluid coupling part having a central through passage, said central through passage comprising a first portion with a first diameter and a second portion with a second, larger diameter;
a second fluid coupling part adapted to extend into said central through passage;
a tube valve, slidably and rotatably received in said central through passage between said coupling parts, for sliding movement between open and closed positions upon insertion and removal of said second coupling part, said valve comprising a third portion with a third diameter for insertion into said first portion and a fourth portion with a fourth, larger diameter for insertion into said second portion, there being a radially extending transition surface between said third and fourth portions, and a radially-extending flange extending from said fourth portion, said flange having a first face, said valve comprising an inner chamber open to said second coupling part and at least one bore extending from said inner chamber and opening into said central through passage when said valve is in said open position;
bore seal means between said valve and said first coupling part for preventing flow of fluid through said at least one bore when said valve is in said closed position;
spring means for acting on said first face of said radially projecting flange and biasing said valve into said closed position;
first auxiliary seal means between said valve and said first coupling part on the opposite side of said at least one bore from said bore seal means for preventing passage of fluid between the interfacing surfaces of said valve and said first coupling part, whereby when said valve is in said open position, fluid pressure is prevented from acting on said first face of said radially projecting flange of said valve to create a force tending to close said valve;
said first auxiliary seal means comprising an annular sealing element between said valve and said central through passage, said sealing element being disposed in an internal annular groove in said first coupling part, said annular groove being defined by first and second side walls, said second sidewall having a lesser height than said first sidewall and being downstream of said first sidewall from fluid pressure exerted within said tube valve, said first wall extending to the inner surface of said first portion of said first fluid coupling part, and said second wall extending to the inner surface of said second portion of said first fluid coupling part, said first auxiliary sealing element further being positioned to be engaged in said open position by said radially extending transition surface of said valve, whereby relative rotation between said valve and said first coupling part is facilitated in said open position.

2. A coupling according to claim 1, wherein annular sealing element is disposed in an internal annular groove in said first coupling part, said radially extending transition surface engages said annular sealing element over an extended area to enable said first and second coupling parts to be easily rotatable relative to each other around their longitudinal axes.

3. A coupling according to claim 2, wherein said at least one bore is a plurality of slanting through-bores disposed around the periphery of said valve and wherein, when said valve is in said closed position, said annular sealing element is located closely adjoining said slanting bores on the opposite side thereof from said first seal means.

4. A coupling according to claim 3, wherein those edges of said slanting bores, which are located at the outer face of said valve nearest said annular sealing element when said valve is in said closed position, are bevelled down to eliminate any sharp edges which might have detrimental effect on said annular sealing element.

5. A coupling according to claim 1, wherein said projecting flange has a second, opposite face and further comprises a second auxiliary sealing means mounted on said second face to coact with said second coupling part upon axial movement thereof which tends to urge said valve in an open position for preventing medium from leaking between the first and second coupling parts.

6. A coupling according to claim 5, wherein said projecting flange extends axially behind said second auxiliary sealing means and said first coupling part comprises a still larger diameter portion for slidably engaging said projecting flange.

7. A coupling according to claim 6, wherein said projecting flange is connected to an axially extending sleeve-shaped member, further comprising a locking ball device for securing said first and second coupling parts, said sleeve-shaped member engaging and releasing said locking ball device when said valve is in said closed position.

8. A coupling according to claim 7, wherein said sleeve-shaped member comprises an inwardly projecting lifting surface for contacting said second coupling part during insertion thereof.

9. A coupling according to claim 7, wherein said first coupling part comprises inwardly projecting tabs at said locking ball device for guiding said second coupling part into said sleeve-shaped member.

10. A coupling according to claim 7, wherein said sleeve shaped member comprises a bevelled free end extending toward said second coupling part, whereby said second coupling part is guided into said sleeve-shaped member.

11. A coupling device according to claim 7, wherein said sleeve-shaped member comprises a first lifting surface and said valve comprises a second lifting surface, said lifting surfaces being for contacting said second coupling part during insert thereof, said second auxiliary sealing means being positioned between said first and second lifting surfaces.

12. A coupling according to claim 6, wherein said projecting flange comprises an outwardly extending shoulder and said first coupling part comprises an inwardly extending shoulder for engaging said outwardly extending shoulder upon sufficient wear of said bore seal means.

13. A coupling according to claim 6, wherein said valve comprises a lifting surface for contacting said second coupling part during insertion thereof.

* * * * *